July 5, 1938.　　　R. R. UHRMACHER　　　2,122,900
METHOD OF AND APPARATUS FOR DISSOLVING SOLUBLE SOLID MATERIALS
Filed Sept. 14, 1937
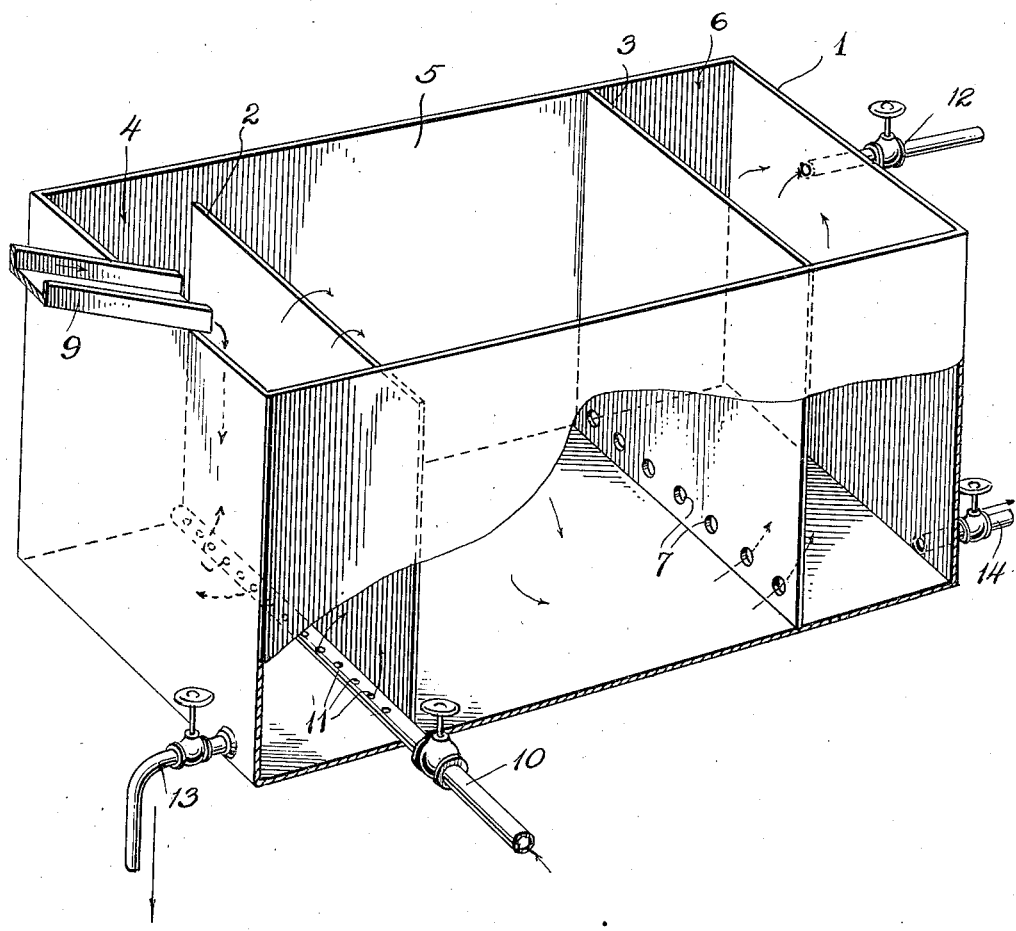
R. R. Uhrmacher　Inventor
By Blair & Kilgore
Attorneys Patented July 5, 1938

2,122,900

UNITED STATES PATENT OFFICE 2,122,900

METHOD OF AND APPARATUS FOR DISSOLVING SOLUBLE SOLID MATERIALS

Ralph Reif Uhrmacher, Louisville, Ky.

Application September 14, 1937, Serial No. 163,855

2 Claims. (Cl. 23—272.1)

This invention relates to an improved and simplified method of and apparatus for dissolving soluble solid materials in appropriate solvents.

Common industrial use requires large quantities of solutions of various solid compounds and substances and in most of these uses it is desirable or even essential that the solution produced be free from insoluble impurities as well as free from turbidity as much as is possible.

For example rock salt as it is mined is generally a mixture of a larger or smaller amount of common salt (sodium chloride) along with varying amounts of soluble and insoluble compounds of iron, aluminum, silica, calcium, magnesium and the like. Accidental introduction of other kinds of impurities such as dirt, dust, cinders, sawdust and the like is common. Unless the insoluble solids are removed from the solutions of sodium chloride used industrially they may be unfit or unsuited for use in many of the processes. The general object of this invention is, therefore, to provide a novel method of, and apparatus for, dissolving solid substances such as rock salt in such a manner as to secure practically a saturated solution free from noticeable turbidity and suspended solids.

Conducive to a clearer understanding of the invention it may be stated that heretofore, apparatus for the dissolving of salts and other substances have been constructed to operate according to rigid specifications, variations in which would seriously affect or vitiate the purpose of the apparatus. Thus one type of apparatus caused a stream of solvent such as water to enter the bottom of a specially shaped vat or tank while the material to be dissolved was fed to the top of the vat or tank. Thus the liquid came in contact with a large surface area of the solid to be dissolved and became more or less saturated with it. In many instances, however, the solution so produced still contained relatively large amounts of suspended or floating solids which interfered seriously with the suitability of the solution for many uses. Another type caused solution to take place in a downward direction in that the liquid percolated through a layer of the solid eventually issuing from or near the bottom of the machine or apparatus. This usually produced a clear solution but due to the tendency of the impurities released on solution to pack into the voids existing between the individual grains of the solid being dissolved the rate with which the apparatus would deliver the said solution gradually decreased resulting in the need for frequent cleaning. In many constructions the cleaning operation resulted in a loss of solid as waste in the wash water, or other solvent.

It may also have been attempted to use compromises on these systems or use both but in so doing they are forced to the use of complicated arrangements and/or expensive or costly equipment and the operations of cleaning and adjusting the many fittings are often onerous to the operators thereof. The use of large and cumbersome valves, the necessity for having much vertical room in which to install such apparatus and the great cost of the finished apparatus indicated the desirability of a simple, inexpensive and reliable apparatus for producing clear solutions. It was found that by having the dissolving operation take place in a counter-current fashion, that is to say, by having the solid move in a direction opposite to that of the liquid dissolving it, that excellent solution would take place, that the solid would tend to be entirely exhausted of soluble material and that finally the incoming stream of solid would tend to carry along mechanically a large part of the insoluble solids. The resulting solution would be relatively free from suspended solids but in order to secure a clear, pure solution it would be necessary to pass the solution through some type of filtering material. The most convenient filtering material is the same solid that is being dissolved. The amount of impurities being very much diminished by the action of the first process, the filter bed has but little tendency to have its voids filled up and so tend to reduce the rate of production of solution.

It is therefore an object of the present invention to cause the solution of the solid to take place in the manner so as to secure counter-current solution and then pass the partially clarified solution so produced through a suitable bed of filtering material to produce a clear, saturated solution. A further object of this invention is to provide an apparatus that will be simple in operation, inexpensive to construct and easy to clean if and when required. A further object of this invention is to enable the operator of the apparatus to continue in the production of solution during the time that the cleaning is taking place so far as this is practical. Another object of this invention is to provide a means of utilizing a salt or other material for the production of clear, saturated solution even though the salt or other material being dissolved contains relatively very large amounts of insoluble solids.

A further object is to provide a simple and practical method which may be inexpensively operated and efficiently carried out. Other objects will be in part obvious and in part hereinafter explained in connection with the accompanying drawing illustrating one form of the apparatus diagrammatically and in a simplified manner.

Referring now to the accompanying drawing in brief, this apparatus includes a tank 1 of any desired material, size, and shape, and as herein shown is divided transversely by two partitions 2 and 3, thereby forming three compartments 4, 5 and 6. The partition 2 terminates slightly below the top of the tank 1 while the partition 3 is provided with openings 7 near the bottom of the tank leading to compartment 6. An inlet chute 9 is provided for conveying the material to be dissolved into the compartment 4 preferably near its top. An inlet solvent pipe 10 enters the bottom of this compartment 4 and has a plurality of openings 11 to admit the solvent evenly and in a direction counter to the downflow of the solid. An overflow or outlet pipe 12 extends through the upper part of the end wall from the compartment 6, for withdrawing the saturated solution, while drain pipes 13 and 14 are provided at the bottom and opposite ends of the tank for the purpose of draining off any liquid or solid matter when it is desired to clean the apparatus. All of these inlet and outlet pipes are preferably provided with valves to control the flow of fluid and the chute for the material to be dissolved may likewise be provided with any standard form of feed control or mechanism. All of these details are of known construction and require no detail disclosure or description.

For convenience in illustration the baffles 2 and 3 are shown as vertical but they may be inclined at almost any angle to the vertical without affecting the operation of the apparatus. It is desirable but by no means essential that each baffle be tightly joined to the walls of the receptacle so as to tend to prevent the passage of liquid around the edges of the baffle. The volume enclosed by each baffle is varied to suit the characteristics of the solid being dissolved but its location may be varied between wide limits without affecting the operation of the apparatus to any marked extent.

While a number of holes 7 in the baffle 3 are located at some point at or near the bottom which allow the solution to enter into compartment 6 of the tank, a similar effect could be produced by raising the bottom of the baffle 3 a short distance above the bottom. For convenience in illustration this baffle is shown as being vertical but as above stated it may be inclined at almost any angle to the vertical without affecting the operation of the apparatus. If desired this baffle may be rigidly fixed to the walls of the receptacle although this is not essential nor particularly desirable.

It is thus seen that the receptacle is divided into three compartments, of which generally the center compartment 5, is the largest. This, again, is not essential to the operation of the apparatus and any of the other compartments may be made the largest without markedly affecting the operation of the apparatus.

In the operation of the apparatus, the salt or other material to be dissolved is supplied to compartment 4 with provision for supplying compartment 5 likewise if salt or other material of the same nature as that being supplied to compartment 4 is to be used as the filtering material. After the apparatus is in normal operation it will be unnecessary to continue the supply of salt or other material to compartment 5. The supply of salt or other material may be continuous or intermittent in any manner convenient. At the same time water or other suitable liquid is supplied to distributing pipe 10 under sufficient pressure to enable it to rise to the top of baffle 2. The amount of this liquid supplied may be regulated by suitable valves as stated. In the event that the solution overflowing baffle 2 is found to be not fully saturated it is advisable to reduce the rate of liquid input to the apparatus to such a point as will insure complete saturation of the solution overflowing the baffle. It will be noted that the flow of water or other liquid here is countercurrent to the flow of the salt or other material to be dissolved. For convenience the liquid is shown as being introduced at the bottom and flowing upward but similar results could be secured by arranging the flow of liquid to flow in a downward or even more or less horizontal path. The essential part of the invention is that the salt or other material move in a path against the flow of the water or other liquid flowing through it. The impurities or insoluble materials will then tend to collect near the point of introduction of water or other liquid and the solution leaving the dissolving compartment 4 will be relatively free of coarse particles of insoluble material. Under normal operation the solution overflowing baffle 2 will be saturated but somewhat turbid and containing floating particles.

The saturated solution produced in compartment 4 is then filtered through a bed of filtering material in compartment 5 and after flowing through the openings 7 in the lower portion of baffle 3 rises in the clear well or compartment 6. In this compartment 6 any fine particles that may have been picked up in passing through the openings in the lower part of baffle 3 are settled out and a clear, saturated solution is available at the solution outlet 12.

In general the compartment that will require periodic cleaning at relatively short intervals is that termed compartment 4. The cleaning is accomplished as follows: the supply of salt or other material is stopped at chute 9 and the flow of water or other liquid allowed to continue until the solution overflowing baffle 3 is no longer saturated. The inflow thru pipe 10 is then somewhat reduced until the liquid is nearly saturated and the apparatus allowed to operate in this manner until practically all of the salt or other material is dissolved in the compartment. Drain opening 13 is then opened and the solids allowed to flush out. The draining may be followed by washing with a hose after which drain opening 13 is closed, the supply of salt or other material is resumed and the input of water or other liquid thru pipe 10 resumed at the desired rate. Inasmuch as the flow of the saturated liquid leaving the dissolving compartment 4 tends to depart from the vertical as the resistance to its flow through the filter bed increases it is apparent that the suspended material in the solution that passes through the filter bed will tend to build up in that part of the filter bed closest to baffle 2. The necessity for cleaning this compartment can be put off to a considerable extent, then, by removing part of this filter bed periodically and utilizing it in compartment 4 if this is feasible or discarding it if not. Eventually the flow of liquid through this filter bed will be almost in a horizontal plane at which time it is desirable to clean it and restore it to its original state. This is done by stopping the input of salt or other material to the apparatus at 9 and allowing the liquid to continue flowing until all of the salt or other material or such part of it as may be desired, has been removed from the apparatus by solution or mechanically if desired. The inflow of water or other liquid at 10 is then stopped, drains 13 and 14 are opened and the solid material left in the apparatus is removed by flushing with a hose or by other means if desired. At the conclusion of this operation the drains 13 and 14 are closed, the appropriate compartments again filled with salt or other material and the input of water or other liquid resumed in the normal fashion.

When utilizing salt or other material that contains large amounts of insoluble impurities or undesirable material it is advantageous to divide compartment 4 into two or more compartments by means of baffles which are best made watertight. These baffles which are not shown in the illustration (since they are a special adaptation of the simplest apparatus) should extend somewhat higher than baffle 2. In the same manner it is possible to divide the other compartment into two or more separate compartments in order to insure continuous operation when handling salt or other materials that contain larger amounts of insoluble solids. It is stressed that vertically disposed baffles are merely mentioned for simplification of discussion as baffles in any plane, properly spaced will operate in a satisfactory manner.

Without further description it is thought that the features and advantages of the invention will be readily apparent to those skilled in the art, and it will be understood that changes in form, proportion or minor details of construction may be resorted to without departing from the spirit of the invention and scope of the appended claims. The apparatus is of simple and practical construction and the method may be performed thereby inexpensively and with a high degree of efficiency. In short the invention herein described is well adapted to accomplish all of the objects and advantages herein set forth.

I claim as my invention:—

1. The method of dissolving salt or other soluble material which comprises flowing into a tank compartment a material to be dissolved and a solvent therefor in substantially opposite directions to form a concentrated solution, passing said solution from the top of the compartment into a second compartment and through a filter bed of the same material to be dissolved to form a saturated solution, subsequently moving the filter bed from the second compartment to the first compartment and utilizing it to make a subsequent initial concentrated solution, replacing the filter bed in the second compartment, withdrawing the saturated solution from the bottom of the second compartment to a third compartment and allowing it to settle therein prior to withdrawal.

2. Apparatus for dissolving salt or other soluble material comprising a receptacle capable of retaining the solution, two baffle structures dividing said receptacle into three compartments, the first of said baffle structures terminating below the top of the receptacle, the other having openings in its lower part to allow flow from one compartment to the other separated thereby, means for feeding material to be dissolved into the upper part of the first compartment, means comprising a transversely extending perforated pipe for supplying a solvent to the lower part of the same compartment whereby the flow of the materials are approximately opposite to each other, the middle compartment having a filter of the same material to be dissolved for the concentrated solution passing therethrough, the perforation in the second baffle structure being below the filter bed through which the saturated solution flows to the third or settling chamber.

RALPH REIF UHRMACHER.